Sept. 15, 1925.
T. MIDGLEY
1,554,016
TIRE MOLD AND BAG THEREFOR
Filed Aug. 28, 1923
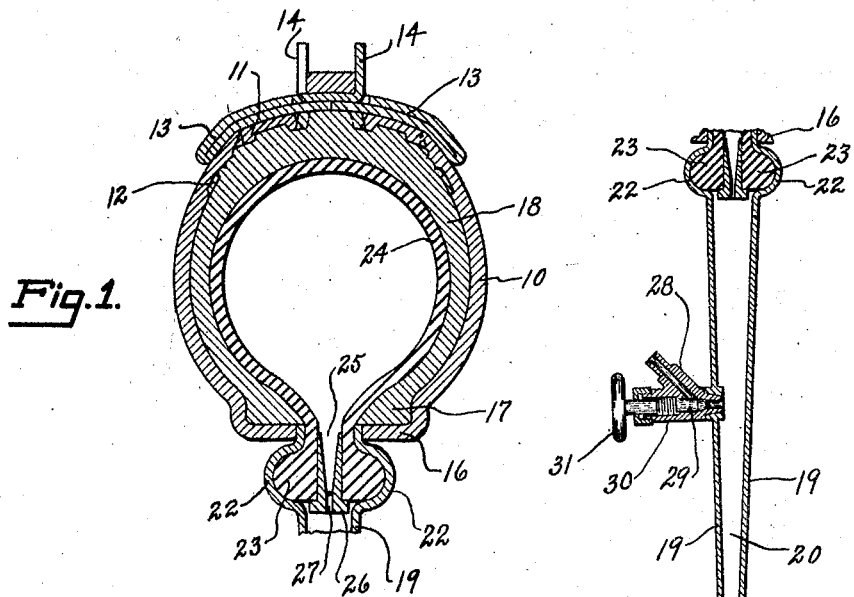
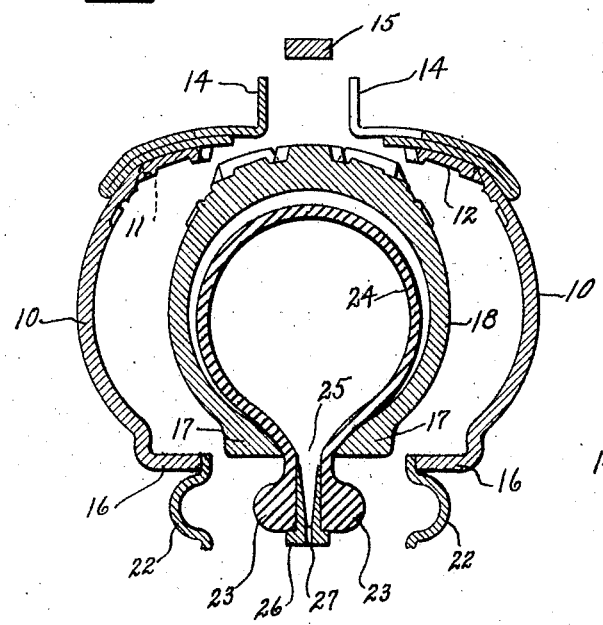
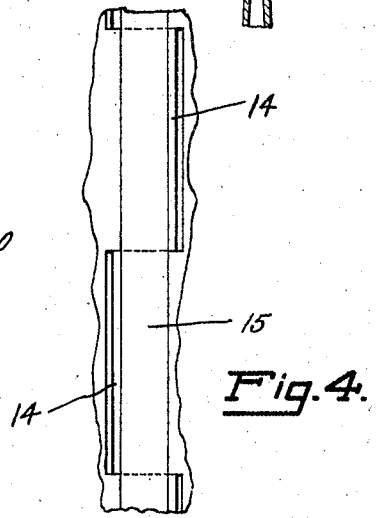
INVENTOR.
Thomas Midgley
BY
Edward C. Taylor
ATTORNEY.

Patented Sept. 15, 1925.

1,554,016

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD AND BAG THEREFOR.

Application filed August 28, 1923. Serial No. 659,814.

*To all whom it may concern:*

Be it known that I, THOMAS MIDGLEY, a citizen of the United States of America, residing at Hampden, in the county of Hampden and State of Massachusetts, have invented certain new and useful Improvements in a Tire Mold and Bag Therefor, of which the following is a specification.

This invention relates to molds adapted for the vulcanization of tire casings under internal fluid pressure, and has particular reference to molds constructed of sheet metal.

Certain general characteristics of the present mold, with respect to its general construction and method of manufacture, have been described and claimed in a copending application filed by me Aug. 28, 1923, Serial No. 659,813. The present invention relates more particularly to the arrangement of apparatus for supplying the internal fluid pressure to the tires.

The invention will now be described with relation to the accompanying drawings in which—

Fig. 1 is a partial section of a mold assembly embodying the invention;

Fig. 2 is a continuation of the parts shown in Fig. 1 on a slightly smaller scale;

Fig. 3 is a view similar to Fig. 1 but showing the parts in separated position; and Fig. 4 is a fragmentary top plan view of the parts shown in Fig. 1.

In general it may be said that the mold constituting the present invention is formed from two disk-like portions having near their outer periphery a chamber formed to receive the tire casing and to impart to it the desired molded form. In the preferred construction of the mold these mating halves of the mold are formed from sheet metal, thereby forming the mold of extremely light material which does not absorb any considerable amount of heat during vulcanization. The disks form between them a fluid-tight chamber, into which a pressure fluid may be admitted to force the tire casing outwardly into the molding cavity. I prefer to apply the fluid pressure to the tire through a fluid containing bag which is circumferentially split at its inner periphery and is held in fluid-tight relation to the disks. The detailed construction of these parts in their preferred embodiment will now be considered.

The molding portions of the disks are preferably constructed in accordance with the disclosure in my copending application mentioned above. According to this construction two side plates 10 are provided, formed at their top portion with suitable perforations 11 and recesses 12 to give the desired tread formation to the tire. Overlying the side plates, and closing the perforations therein so as to form these into molding cavities, are folded plates 13. The outer folds of these plates are cut and bent to form lugs 14, interlocking with each other as more clearly shown in Fig. 4. When the mold is assembled, these lugs interlock with each other and present a somewhat similar appearance to the interlaced fingers of the hands as these are held with their palms up. The lugs are of sufficient length to pass by each other and to receive between them a split ring 15 which, when sprung into position between the two sets of lugs, effectively holds the two mold sections together. The preferred manner of securing the folded top plates to the side plates is by spot welding.

The inner edges of the side plates are folded at 16 so as to underlie the bead portions 17 of the tire casing 18. Attached to these underlying flanges 16, preferably by spot welding, are disks 19 which, together with the mold halves above described, enclose a fluid-tight space or chamber indicated by 20 (Fig. 2). These disks are preferably dished so as to approach each other near the axis of the mold, as indicated at 21, so as to reduce the volume of the chamber as much as possible. Adjacent the flanges 16 the disks 19 are formed with circumferential enlargements 22, into which fit beaded base portions 23 of a fluid-containing bag 24 which is circumferentially split around its inner periphery at 25. The beaded portions of the bag are held out into the enlargements 22 by a ring 26 having perforations 27 therein which permit passage of the pressure fluid from the chamber 20 to the interior of the bag. When the mold is closed upon the ring, the closing pressure will cause a fluid-tight joint to be made between the bag and the disks so that the only outlet for the fluid pressure in chamber 20 is into the interior of the bag 24. While the mold is in use, this closing pressure is assisted in preserving this joint by the outward action of the pressure fluid.

Fluid pressure may be introduced into the chamber 20 in any desired way. As shown in Fig. 2 an inlet pipe 28 is adapted to be closed by a valve stem 29, screwed into a housing 30 and provided with a hand wheel 31. By this construction fluid pressure may be introduced into the chamber, and consequently into the airbag, and the chamber then closed by the valve so that the pressure will be retained.

Owing to the circumferentially split nature of the base of the bag, and the fact that it is positively held in position by the enlargements 22, the base of the bag need not be formed of hard rubber as is customarily the case in fluid-containing bags used for the vulcanization of the tire casings. This greatly increases the ease with which the bag may be placed within and removed from the tire casing, and increases the life of the bag. The ring 26 can be placed readily between the two base portions of the bag before the bag, and the tire mounted thereon, are placed between the halves of the mold.

Having thus described my invention, I claim:

1. A mold adapted for use in the vulcanization of tire casings comprising mating mold halves constructed to impart the desired molded form to the tire, plates closing the circular openings within the mold halves to form, when the mold halves are assembled, a fluid-tight chamber between the bead edges of the tire, annular enlargements on said central plates adapted to receive beaded base portions of a fluid bag split circumferentially around its inner periphery, and a perforated ring adapted to fit within the beaded edges of the bag to hold them separated and in fluid-tight contact with the central plates.

2. A tire vulcanizing assembly comprising an annular mold adapted to fit around the tire to be vulcanized, a fluid bag adapted to fit within the tire, said bag being circumferentially split around its inner periphery, plates closing the circular opening within the annular mold, said plates being dished towards each other at the axis of the mold, and a ring entering between the circumferentially divided edges of the bag to keep the same separated and in fluid-tight contact with the other named parts.

3. A mold assembly adapted for use in the vulcanization of tire casings comprising annular mating sheet metal mold halves constructed to impart the desired form to the tire and having flanges underlying the tire beads, plates secured to said flanges and closing the circular space within the mold halves, said plates being dished towards each other at the axis of the mold, a fluid bag adapted to be expanded by fluid pressure to press the tire into the mold, said bag being circumferentially split around its inner periphery and provided with beaded base portions, circumferential enlargements formed in said plates and adapted to receive the beaded portions of the bag, and a perforated ring lying between the base portions of the bag and adapted to preserve fluid-tight contact between the bag and the surrounding mold.

4. An annular bag adapted to receive pressure fluid in the vulcanization of tire casings being circumferentially split around its inner circumference, and having beaded base portions adapted to be received in corresponding portions of the tire mold.

THOMAS MIDGLEY.